United States Patent
Ko et al.

(10) Patent No.: US 12,482,871 B2
(45) Date of Patent: Nov. 25, 2025

(54) METHOD AND APPARATUS FOR OPTIMIZING BATTERY

(71) Applicant: Samsung Electronics Co., Ltd., Suwon-si (KR)

(72) Inventors: Jeongsik Ko, Hanam-si (KR); Jinho Kim, Yongin-si (KR); Younghun Sung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 357 days.

(21) Appl. No.: 17/332,125

(22) Filed: May 27, 2021

(65) Prior Publication Data

US 2022/0200071 A1 Jun. 23, 2022

(30) Foreign Application Priority Data

Dec. 17, 2020 (KR) .................. 10-2020-0176975

(51) Int. Cl.
*H01M 10/48* (2006.01)
*G01R 31/367* (2019.01)
*H01M 10/44* (2006.01)

(52) U.S. Cl.
CPC ........ *H01M 10/486* (2013.01); *G01R 31/367* (2019.01); *H01M 10/443* (2013.01)

(58) Field of Classification Search
CPC .. H01M 10/486; H01M 10/482; H01M 10/48; H01M 10/443; H01M 10/441; H01M 10/44; G01R 31/367
See application file for complete search history.

(56) References Cited

U.S. PATENT DOCUMENTS

| 8,412,658 B2 | 4/2013 | Song et al. |
| 11,262,407 B2 | 3/2022 | Park et al. |
| 2015/0081237 A1 | 3/2015 | Ye et al. |
| 2015/0355283 A1 | 12/2015 | Lee |
| 2019/0195956 A1 | 6/2019 | Lim et al. |

FOREIGN PATENT DOCUMENTS

| CN | 108791303 A | 11/2018 | |
| CN | 111934343 | * 11/2020 | ............... H02J 3/38 |
| JP | 2018-84548 A | 5/2018 | |
| KR | 10-2014-0026068 A | 3/2014 | |
| KR | 10-2015-0060267 A | 6/2015 | |

(Continued)

OTHER PUBLICATIONS

Computer-generated translation of CN 111934343, Qu et al., "Simulation Model Of Electrochemical Energy Storage System For Electromechanical Simulation Analysis Of Power Grid", Nov. 13, 2020.*

(Continued)

*Primary Examiner* — Raymond Alejandro
(74) *Attorney, Agent, or Firm* — Sughrue Mion, PLLC

(57) ABSTRACT

A battery optimization method and apparatus is provided. The battery optimization method includes selectively adjusting a parameter set related to a corresponding SoC section among a plurality of parameters of an electrochemical thermal (ECT) model based on operating data of each SoC section, and updating the plurality of parameters of the ECT model based on adjusted parameter sets.

9 Claims, 11 Drawing Sheets

(56) References Cited

FOREIGN PATENT DOCUMENTS

| | | |
|---|---|---|
| KR | 10-2017-0052936 A | 5/2017 |
| KR | 10-2018-0041462 A | 4/2018 |
| KR | 10-2019-0061630 A | 6/2019 |
| KR | 10-2019-0067469 A | 6/2019 |
| WO | WO 2019/053557 A1 | 3/2019 |

OTHER PUBLICATIONS

Extended European Search Report issued on Jan. 28, 2022 in counterpart European Patent Application No. 21189354.0 (6 pages in English).

Korean Office Action issued on Apr. 1, 2025 in corresponding Korean Patent Application No. 10-2020-0176975. (2 pages in English and 8 pages in Korean).

* cited by examiner

METHOD AND APPARATUS FOR OPTIMIZING BATTERY

CROSS-REFERENCE TO RELATED APPLICATIONS

This application claims the benefit under 35 USC § 119(a) of Korean Patent Application No. 10-2020-0176975, filed on Dec. 17, 2020, in the Korean Intellectual Property Office, the entire disclosure of which is incorporated herein by reference for all purposes.

BACKGROUND

Field

The following description relates to a battery optimization method and apparatus.

2. Description of Related Art

A state of a battery is estimated for optimal operation of the battery, and various methods are used to estimate the state of the battery. For example, the state of the battery may be estimated by integrating current of the battery or estimated using a battery model (e.g., an electric circuit model or electrochemical thermal model). In a current integration method, an amount of charge remaining in the battery is calculated by calculating a total amount of charged and discharged power using a current sensor attached to an end of a battery cell, module, or pack. The electric circuit model is a circuit model including a resistor and a capacitor that can express a change of the voltage value as the battery is charged and discharged. The electrochemical thermal model models an internal physical phenomenon of the battery such as, battery ion concentration and potential.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a battery optimization method including determining a first state of charge (SoC) value corresponding to first operating data of a battery, selecting a first SoC section corresponding to the first SoC value from an SoC section, selectively adjusting, based on the first operating data, a first parameter set related to the first SoC section from among parameters of an electrochemical thermal (ECT) model configured to simulate the battery, and updating the parameters of the ECT model based on the adjusted first parameter set.

The parameters of the ECT model may include a second parameter set related to a second SoC section of the SoC section, and the selectively adjusting of the first parameter set based on the first operation data may include maintaining the second parameter set without being adjusted.

The selectively adjusting of the first parameter set may include determining an estimated voltage of the ECT model using the first operating data and the parameters, determining an optimization loss based on a measured voltage of the first operating data and the estimated voltage of the ECT model, and adjusting at least one parameter of the first parameter set to reduce the optimization loss.

The adjusting of the at least one parameter of the first parameter set may include determining a candidate parameter of the first parameter set to reduce the optimization loss through Bayesian optimization, and adjusting the candidate parameter.

The parameters of the ECT model may include one of a constant parameter independent of a SoC level of the battery and a diffusion parameter dependent on the SoC level of the battery, and each parameter of the first parameter set may be the diffusion parameter.

The diffusion parameter may include one of a charging parameter related to charging of the battery and a discharging parameter related to discharging of the battery.

The first parameter set may include the charging parameter, in response to the first operating data being measured during the charging of the battery, and the first parameter set may include the discharging parameter, in response to the first operating data being measured during the discharging of the battery.

The constant parameter may include one of a film resistance, a volume fraction of an active material, and an anode-cathode open circuit potential (OCP) offset.

The battery may be configured to supply power to a battery powered apparatus, and the first operating data may be generated in response to the battery supplying the power to the battery powered apparatus.

The first operating data may include at least one of a voltage, a current, or a temperature of the battery according to an operation of the battery.

The battery optimization method may include determining a new first parameter set by updating the first parameter set, in response to the selective adjusting of the first parameter set being completed, and selectively adjusting a second parameter set related to a second SoC section of the SoC section based on new parameters of the ECT model including the new first parameter set.

The selectively adjusting of the second parameter set may include determining a second SoC value corresponding to second operating data of the battery, selecting the second SoC section to which the second SoC value belongs from the SoC section, and selectively adjusting, based on the first operating data and the second operating data, the second parameter set related to the second SoC section from among the new parameters of the ECT model.

The different adjustment weights may be applied to selectively adjust the first parameter set and selectively adjust the second parameter set.

In another general aspect, there is provided a battery optimization apparatus including a processor configured to determine a first state of charge (SoC) value corresponding to first operating data of a battery, select a first SoC section corresponding to the first SoC value from an SoC section, selectively adjust, based on the first operating data, a first parameter set related to the first SoC section from among parameters of an electrochemical thermal (ECT) model configured to simulate the battery, and update the parameters of the ECT model based on the adjusted first parameter set.

The parameters of the ECT model may include a second parameter set related to a second SoC section of the SoC section, and the processor may be configured to maintain the second parameter set without being adjusted, in response to selectively adjusting the first parameter set based on the first operation data.

The processor may be configured to determine a new first parameter set by updating the first parameter set, in response to the selective adjustment of the first parameter set being completed, and selectively adjust a second parameter set related to a second SoC section of the SoC section based on new parameters of the ECT model including the new first parameter set.

In another general aspect, there is provided an electronic apparatus including a battery configured to supply power to the electronic apparatus, and a processor configured to determine a first state of charge (SoC) value corresponding to first operating data of a battery, select a first SoC section corresponding to the first SoC value from an SoC section, selectively adjust, based on the first operating data, a first parameter set related to the first SoC section from among parameters of an electrochemical thermal (ECT) model configured to simulate the battery, and update the parameters of the ECT model based on the adjusted first parameter set.

The parameters of the ECT model further may include a second parameter set related to a second SoC section of the SoC section, and the processor may be configured to maintain the second parameter set without being adjusted, in response to selectively adjusting the first parameter set based on the first operation data.

The processor may be configured to determine a new first parameter set by updating the first parameter set, in response to the selective adjustment of the first parameter set being completed, and selectively adjust a second parameter set related to a second SoC section of the SoC section based on new parameters of the ECT model including the new first parameter set.

In another general aspect, there is provided a processor-implemented method of optimizing a battery, including segmenting a state of charge (SoC) value in two or more sections based on a value of the SoC, selecting a first SoC segment from the two or more segments corresponding to first operating data of a battery, selectively adjusting, based on the first operating data, a first parameter set related to the first SoC segment from among parameters of an electrochemical thermal (ECT) model, selecting a second SoC segment from the two or more segments corresponding to second operating data of a battery, selectively adjusting, based on the first operating data and the second operating data, a second parameter set related to the second SoC segment from among parameters of an electrochemical thermal (ECT) model, and updating the parameters of the ECT model based on the adjusted first parameter set and the second parameter set.

The selectively adjusting of the first parameter set and the first parameter set may be performed at periodic time intervals.

The first operating data and the second operating data may be generated in a charging cycle of the battery.

The first operating data and the second operating data may be generated in a discharging cycle of the battery.

The battery optimization method may include applying a weight to a SoC segment from the two or more segments having a lowest SoC value.

Other features and aspects will be apparent from the following detailed description, the drawings, and the claims.

Figure 1:
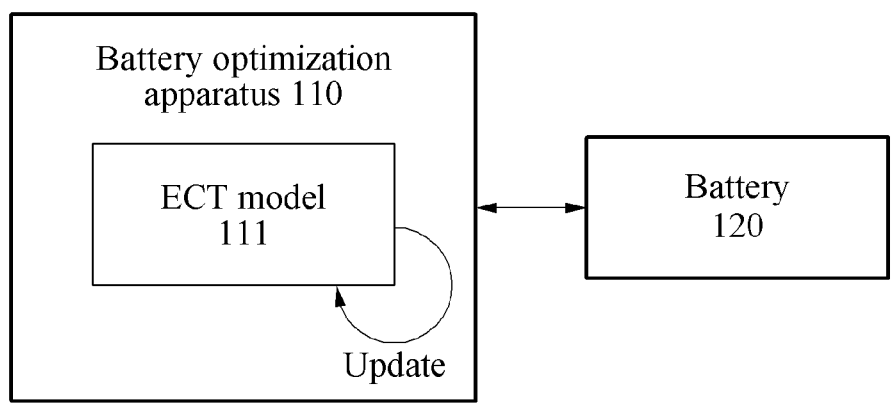
FIG. 1 illustrates an example of an operation of a battery optimization apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as A, B, C, (a), (b), (c), "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," "has," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an example of an operation of a battery optimization apparatus. Referring to FIG. 1, an electrochemical thermal (ECT) model 111 may simulate an internal state of a battery 120 using various ECT parameters and governing equations. A battery optimization apparatus 110 may estimate a state of charge (SoC) of the battery 120 using the ECT model 111. For example, parameters of the ECT model 111 may represent a shape, such as, for example, thickness and radius, an open circuit potential (OCP), and physical properties of the battery, such as, for example, electrical conductivity, ionic conductivity, and diffusion coefficient. The governing equations may include physical conservation equations related to an electrochemical reaction occurring at an interface of an electrode and an electrolyte based on the parameters and concentration and charge conservation of the electrode and the electrolyte.

The battery optimization apparatus 110 may collect operating data of the battery 120 and estimate a state of the battery 120 using the operating data and the ECT model 111. For example, the operating data may include at least one of a voltage, a current, and a temperature of the battery 120 according to an operation of the battery 120. As the battery 120 continues to operate, a cell state may change due to deterioration or replacement of a battery cell. The change in the cell state may reduce an accuracy of SoC estimation based on the ECT model 111. The battery optimization apparatus 110 may update the parameters of the ECT model 111 based on the change in the cell state, thereby maintaining the accuracy of estimation.

The battery optimization apparatus 110 may collect operating data of the battery 120 during the operation of the battery 120, obtain an optimization loss by calculating the ECT model 111 based on the operating data, and update ECT parameters such that the optimization loss decreases. Since the operating data corresponds to a measured value, a difference between an estimated value of the ECT model 111 and the measured value of the operating data may correspond to the optimization loss.

The ECT parameters may include a constant parameter that is independent of a SoC level of the battery 120 and a diffusion parameter that is dependent on the SoC level. For example, when the SoC level is gradually decreased due to the operation of the battery 120, the constant parameter may be constantly maintained and the diffusion parameter may change. The battery optimization apparatus 110 may selectively update parameters having a high correlation with deterioration of the battery 120 among the constant parameters, such as a film resistance, a volume fraction of an active material, and an anode-cathode OCP offset. In addition, the battery optimization apparatus 110 may selectively adjust the diffusion parameter based on a SoC section of the operating data. An update process of the ECT parameters will be described later in greater detail.

As described below, the selective adjustment of the diffusion parameter may allow an error in each parameter to be corrected based on an optimization loss of a corresponding section. Through this, the training accuracy may be improved. In addition, the selective update may significantly reduce an operation for update and increase an update speed. The reduced operation and the quick update may realize on-device training.

The parameter update may be performed at intervals of a predetermined time period, such as, for example, once a month and once a quarter, or at a specific time, such as, for example, in response to a request from a user, a request from a developer. In addition, the parameter update may be performed in connection with a change in a state of health (SoH) of the battery 120. For example, the parameter update may be performed every time that the SoH is reduced by 10%. To avoid the inconvenience that a device is unavailable at the time of updating, in an example, the battery optimization apparatus 110 may request prior approval from the user before the update is performed. In an example, the battery optimization apparatus 110 may perform the parameter update at a time when the device is little used, such as late at night.

When the parameter of the ECT model 111 is optimized according to the parameter update, a target apparatus may estimate the SoC of the battery 120 using the ECT model 111 having the optimized parameter. The target apparatus may be an apparatus that receives power from the battery 120 and may be, for example, a battery powered apparatus 1000 of FIG. 10. In accordance with the parameter of the ECT model 111 maintained as being optimized, the target apparatus may estimate the SoC with a high accuracy. The target apparatus may use an existing parameter while the parameter update of the ECT model 111 is performed. In a new cycle after the update is completed, the target apparatus may use an updated parameter.

As described below, a parameter set may be updated for each SoC section. When there is a difference in time that the update is completed for SoC sections, each updated parameter set may be individually used based on a point in time that the update of the corresponding section is completed. For example, although an update of a first parameter set of a first SoC section is completed, an update of a second parameter set of a second SoC section may be in progress. In this example, the updated first parameter set may be used to estimate a SoC of the first SoC section, and the existing second parameter set may be used to estimate a SoC of the second SoC section.

Figure 2:
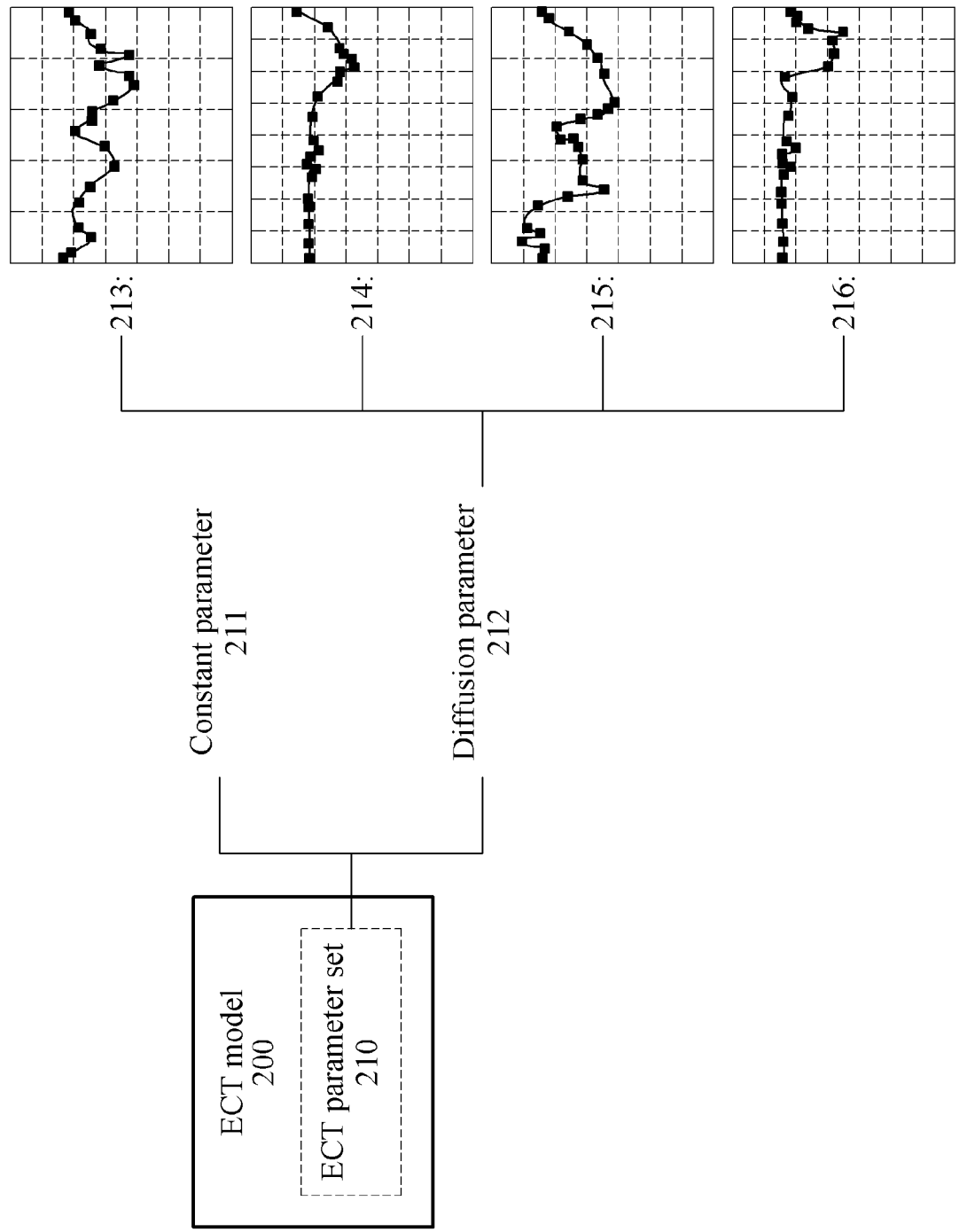
FIG. 2 illustrates an example of electrochemical thermal (ECT) parameter classification.

FIG. 2 illustrates an example of ECT parameter classification. Referring to FIG. 2, an ECT model 200 stores an ECT parameter set 210. ECT parameters of the ECT parameter set 210 may be classified as a constant parameter 211 and a diffusion parameter 212. For example, the constant parameter 211 may include a shape (e.g., thickness, radius, etc.) of a cell independent of a SoC level of a battery, resistance, and an OCP. The diffusion parameter 211 may include a diffusion coefficient dependent on the SoC level. The diffusion parameter may be further classified as one of a charging parameter related to battery charging and a discharging parameter related to battery discharging.

In an example, parameters 213 may be anode discharging parameters. In an example, parameters 214 may be cathode discharging parameters. In an example, parameters 215 may be anode charging parameters. In an example, parameters 216 may be cathode charging parameters. The parameters 213 through 216 are plotted on each graph. In the graph, a horizontal axis represents a SoC and a vertical axis represents a diffusion coefficient. The diffusion parameter 211 may be defined as required intervals. For example, in FIG. 2, the parameters 213 are represented by about 20 dots along SoC levels 0.0 to 1.0. However, depending on definitions, the greater number of the parameters 213 may be plotted densely or the smaller number of the parameters 213 may be plotted coarsely.

An initial value of the ECT parameter set 210 may be experimentally determined through a process such as, a detailed tuning process. When a battery cell state is changed in response to a device being used, the battery optimization apparatus may update the ECT parameter set 210 with a new value based on the changed state. Through this, a SoC estimation accuracy and an optimized state of the ECT parameter set 210 may be maintained.

Figure 3:
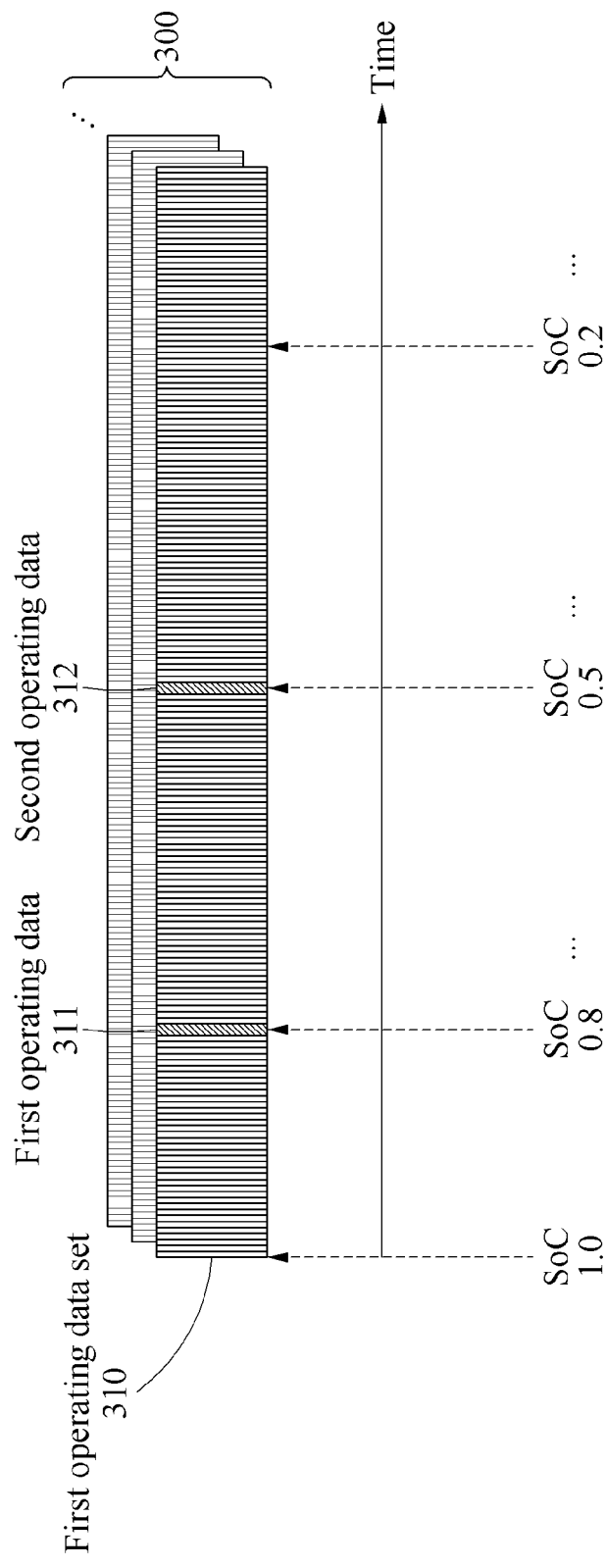
FIG. 3 illustrates an example of operating data sets.

FIG. 3 illustrates an example of operating data sets. Referring to FIG. 3, operating data sets 300 may be generated during an operation of a battery. The operating data sets 300 may include various battery-related data, for example, at least one of a voltage, a current, and a temperature of a battery, which are measured through various sensors connected to the battery.

Each operating data set of the operating data sets 300 may be collected based on a SoC. For example, while the SoC decreases from 1.0 to 0.0, an operating data set may be generated. Also, while the SoC decreases from 1.0 to 0.0 again after the battery is fully charged, another operating data set may be generated. Here, 1.0 and 0.0 are merely an example, and an operating data set may also be generated in other SoC sections. For example, an operating data set may be generated while the SoC decreases from 1.0 to 0.3, and an operating data set may also be generated in a charging cycle.

The following description will be given of a first operating data set 310 of the operating data sets 300 as an example. The operating data sets 300 may include m operating data sets. The first operating data set 310 corresponds to one of the m operating data sets. The first operating data set 310 includes first operating data 311 and second operating data 312. The first operating data set 310 may include n data values.

The battery optimization apparatus may adjust each diffusion parameter based on a SoC section. The battery optimization apparatus may obtain an optimization loss based on each of the operating data and selectively adjust corresponding diffusion parameters of a corresponding SoC section based on the optimization loss.

For example, the first operating data 311 may correspond to a SoC value of 0.8, and the second operating data 312 may correspond to a SoC value of 0.5. When the entire SoC section (e.g., 1.0 through 0.0) is divided into a plurality of sub-sections, a corresponding section of each of the operating data may be selected from among the sub-sections. For example, when the entire SoC section is divided into three sub-sections, the SoC value of 0.8 may belong to a first section and the SoC value of 0.5 may belong to a second section. Accordingly, the battery optimization apparatus may selectively adjust parameters related to a first section using the optimization loss derived from the first operating data 311 and selectively adjust parameters related to a second section using the optimization loss derived from the second operating data 312.

Since the SoC level decreases with time in the operating data sets 300, the operating data sets 300 may represent discharging of the battery. The operating data sets 300 may be used to adjust a discharging parameter from among the diffusion parameters. Unlike the operating data sets 300, when other operating data sets are generated during the charging of the battery, the SoC level increases with time in the operating data sets, the operating data sets may be used to adjust a charging parameter among the diffusion parameters.

Figure 4:
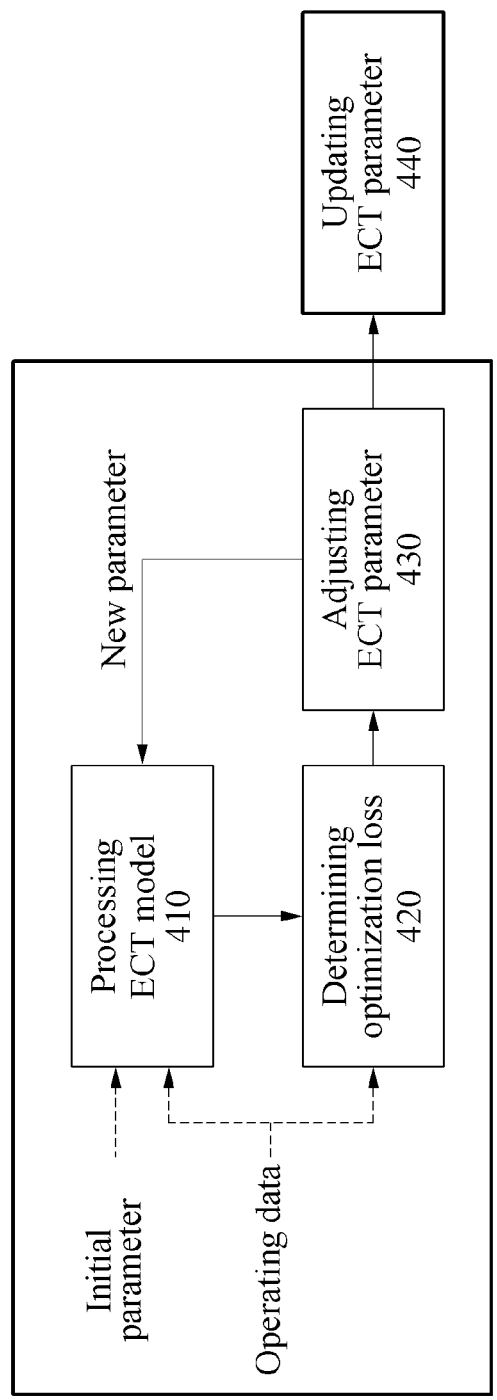
FIG. 4 illustrates an example of a parameter optimization process.

FIG. 4 illustrates an example of a parameter optimization process. FIG. 4 illustrates an example of a method of training a neural network to generate an image. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, a battery optimization apparatus may process an ECT model and determine an estimated voltage. The battery optimization apparatus may process the ECT model based on an initial parameter at an initial iteration and may process the ECT model based on a new parameter according to a parameter adjustment, starting from a subsequent iteration. The initial parameter may be determined through a tuning process.

The estimated voltage may be determined through the processing of the ECT model. This process may be represented by Equation 1 below.

$$\tilde{V} = ECT(I, T; \theta)$$

In Equation 1, $\tilde{V}$ denotes an estimated voltage, ECT denotes a voltage estimating operation using an ECT model, I denotes a battery current, T denotes a battery temperature, and $\theta$ denotes an ECT parameter set. I, T may be acquired from an operating data set. As described with reference to FIG. 3, the operating data set may include n pieces of operating data, each including a voltage, a current, and a temperature of the battery. This can be shown as $V=\{v_1, v_2, \ldots, v_n\}$, $I=\{i_1, i_2, \ldots, i_n\}$, and $T=\{t_1, t_2, \ldots, t_n\}$, for example. At the initial iteration, an initial parameter set $\theta_{init}$ may be used. The battery optimization apparatus may process the ECT model based on I, T, and $\theta_{init}$, thereby estimating $\tilde{V}=\{\tilde{v}_1, \tilde{v}_2, \ldots \tilde{v}_n\}$.

In operation 420, the battery optimization apparatus may determine an optimization loss. $V=\{v_1, v_2, \ldots, v_n\}$ of the operating data corresponds to a measured value and thus, may be called a "measured voltage." Also, $\tilde{V}=\{\tilde{v}_1, \tilde{v}_2, \ldots \tilde{v}_n\}$ according to the processing of the ECT model corresponds to an estimated value and thus, may be called an "estimated voltage." The optimization loss may correspond to a difference between the measured voltage and the estimated voltage.

In operation 430, the battery optimization apparatus may adjust an ECT parameter and determine a new parameter. For example, at the initial iteration, the battery optimization apparatus may adjust a parameter value of the initial parameter and determine a new parameter. The battery optimization apparatus may adjust an ECT parameter value in a direction in which the optimization loss is reduced, for example, a direction in which the optimization loss is minimized. This process can be shown by Equation 2 below.

$$\hat{\theta} \leftarrow \operatorname*{argmin}_{\Theta} \sum_{i=1}^{n} (v_i - \tilde{v}_i)^2 \qquad \text{[Equation 2]}$$

In Equation 2, $\hat{\theta}$ denotes a new parameter, $v_i$ denotes a measured voltage, and denotes an estimated voltage. When optimization is not completed, the battery optimization apparatus may perform operation 410 again based on the new parameter $\hat{\theta}$ and then, derive another new parameter $\hat{\theta}$ in operation 430. When optimization is completed, the battery optimization apparatus may determine the new parameter $\hat{\theta}$ to be an optimal parameter $\theta_{opt}$ and update the ECT parameter with the optimal parameter $\theta_{opt}$ in operation 440. For example, when m operating data set correspond to m targets to be trained, and when a current iteration corresponds to an m-th iteration, it may be determined that the optimization is completed. Also, when a threshold performance index (e.g., very low optimization loss) is achieved, it may be determined that the optimization is completed.

In an example, the battery optimization apparatus may perform an optimization process of operations 410 through 430 based on machine learning. In this process, a machine learning model may learn operating data, so that the optimal parameter $\theta_{opt}$ is derived. In an example, the battery optimization apparatus may employ Bayesian optimization. Bayesian optimization is a technique for optimizing a value of an unknown objective function using a surrogate model and an acquisition function. The surrogate model performs probabilistic estimation of the objective function based on function values and input values obtained so far. The acquisition function recommends useful candidates for finding an optimal solution using a result of the surrogate model. The battery optimization apparatus may determine a candidate parameter that reduces the optimization loss through the Bayesian optimization and adjust a parameter of the parameter set to be the candidate parameter.

According to Equation 2, an optimization loss of the entire SoC section may be applied to the entire ECT parameter set. In another example, the battery optimization apparatus may selectively adjust a parameter set for each SoC section. Through this, an error of each parameter may be corrected based on an optimization loss of a corresponding section, which may improve a training accuracy. In addition, the selective parameter update may significantly reduce an operation for update and increase an update speed. For example, when the entire SoC section is divided into three sub-sections, the battery optimization apparatus may perform optimization using Equations 3 through 5. Equation 3 is associated with the first SoC section, Equation 4 is associated with the second SoC section, and Equation 5 is associated with the third SoC section. However, it is merely an example, and the battery optimization apparatus may also perform optimization by dividing a SoC section into various number of sections, such as dividing a SoC section into two sections, or four or more sections.

$$\hat{\theta}_1 \leftarrow \operatorname*{argmin}_{\Theta} \sum_{i=1}^{j} (v_i - \tilde{v}_i)^2 \qquad \text{[Equation 3]}$$

According to Equation 3, an optimization loss is derived from sections 1 through j. Indices 1 through j may correspond to the first SoC section (e.g., in a case of discharging, a section of 1.0 through 0.7). In this case, the battery optimization apparatus may derive an optimization loss while selectively adjusting parameters related to the first SoC section (hereinafter, also be referred to as a "first parameter set") in the parameter set θ. Through this, a new parameter set, for example, a parameter set $\hat{\theta}_1$ may be estimated. The new parameter set $\hat{\theta}_1$ may correspond to a version in which the first parameter set related to the first SoC section is adjusted in the entire parameter set θ. For example, when operating data corresponds to discharging data, the first parameter set may correspond to parameters belonging to the first SoC section among discharging parameters of the parameter set θ. Thereafter, a value of the first parameter set may be fixed, so that optimization for the second SoC section is continuously performed using Equation 4.

$$\hat{\theta}_2 \leftarrow \operatorname*{argmin}_{\hat{\theta}_1} \sum_{i=1}^{k} (v_i - \tilde{v}_i)^2 \qquad \text{[Equation 4]}$$

According to Equation 4, an optimization loss is derived in a section of 1 through k, k being an integer greater than j. Indices j+1 through k may correspond to the second SoC section (e.g., in a case of discharging, a section of 0.7 through 0.4). A reason that the optimization loss is derived with the indices 1 to k instead of the indices j+1 to kin Equation 4 is due to a continuity of the operating data. Battery charging and discharging data may have a continuous property that a previously applied current has an effect even thereafter. For this reason, if information on an intermediate time point (e.g., a time point of i=j+1) is used to estimate a SoC of subsequent time points (e.g., time points of i=j+2 to i=k), an error may occur. Accordingly, an initial time point (e.g., a time point of i=1) may be used instead of the intermediate time point (e.g., the time point of i=j+1).

The battery optimization apparatus may derive the optimization loss while selectively adjusting parameters related to the second SoC section (hereinafter, also referred to as a "second parameter set") in the parameter set $\hat{\theta}_1$. Through this, a new parameter set, for example, a parameter set 2 may be estimated. The new parameter set may correspond to a version in which the second parameter set related to the second SoC section is adjusted in the entire parameter set $\hat{\theta}_1$. At this time, the first parameter set may be fixed in a process of deriving a candidate for optimization. As such, the selective adjustment may significantly reduce an operation required for optimization. For example, when the operating data corresponds to discharging data, the second parameter set may correspond to parameters belonging to the second SoC section from among discharging parameters of the parameter set $\hat{\theta}_1$. Thereafter, values of the first parameter set and the second parameter set may be fixed, so that optimization for the third SoC section is continuously performed using Equation 5.

$$\hat{\Theta}_3 \leftarrow \underset{\hat{\Theta}_2}{\mathrm{argmin}} \sum_{i=1}^{n} (v_i - \tilde{v}_i)^2 \qquad \text{[Equation 5]}$$

According to Equation 5, an optimization loss is derived in a section of 1 through n, n being an integer greater than k. Indices k+1 through n may correspond to the third SoC section (e.g., in a case of discharging, a section of 0.4 through 0.0). Due to the above-described continuity of the operating data, the optimization loss may be derived with the indices 1 to n instead of the indices k+1 to n.

The battery optimization apparatus may derive the optimization loss while selectively adjusting parameters related to the third SoC section (hereinafter, also referred to as a "third parameter set") in the parameter set $\hat{\theta}_2$. Through this, a new parameter set, for example, a parameter set $\hat{\theta}_3$ may be estimated. The new parameter set $\hat{\theta}_3$ may correspond to a version in which the third parameter set related to the third SoC section is adjusted in the entire parameter set 2. At this time, the first parameter set, and the second parameter set may be fixed in a process of deriving a candidate for optimization. For example, when the operating data corresponds to discharging data, the third parameter set may correspond to parameters belonging to the third SoC section among discharging parameters of the parameter set Thereafter, the parameter set may be determined to be a new parameter $\hat{\theta}$ of a current iteration.

The above description given of the selective adjustment may similarly apply to a charging parameter. When operating data according to battery charging exists, each operating data value may be classified to a plurality of SoC sections and used to selectively adjust a charging parameter of a corresponding SoC section. For example, the entire SoC section may be divided into the first SoC section of 0.0 through 0.4, the second SoC section of 0.4 through 0.7, and the third SoC section of 0.7 through 1.0.

Figure 5:
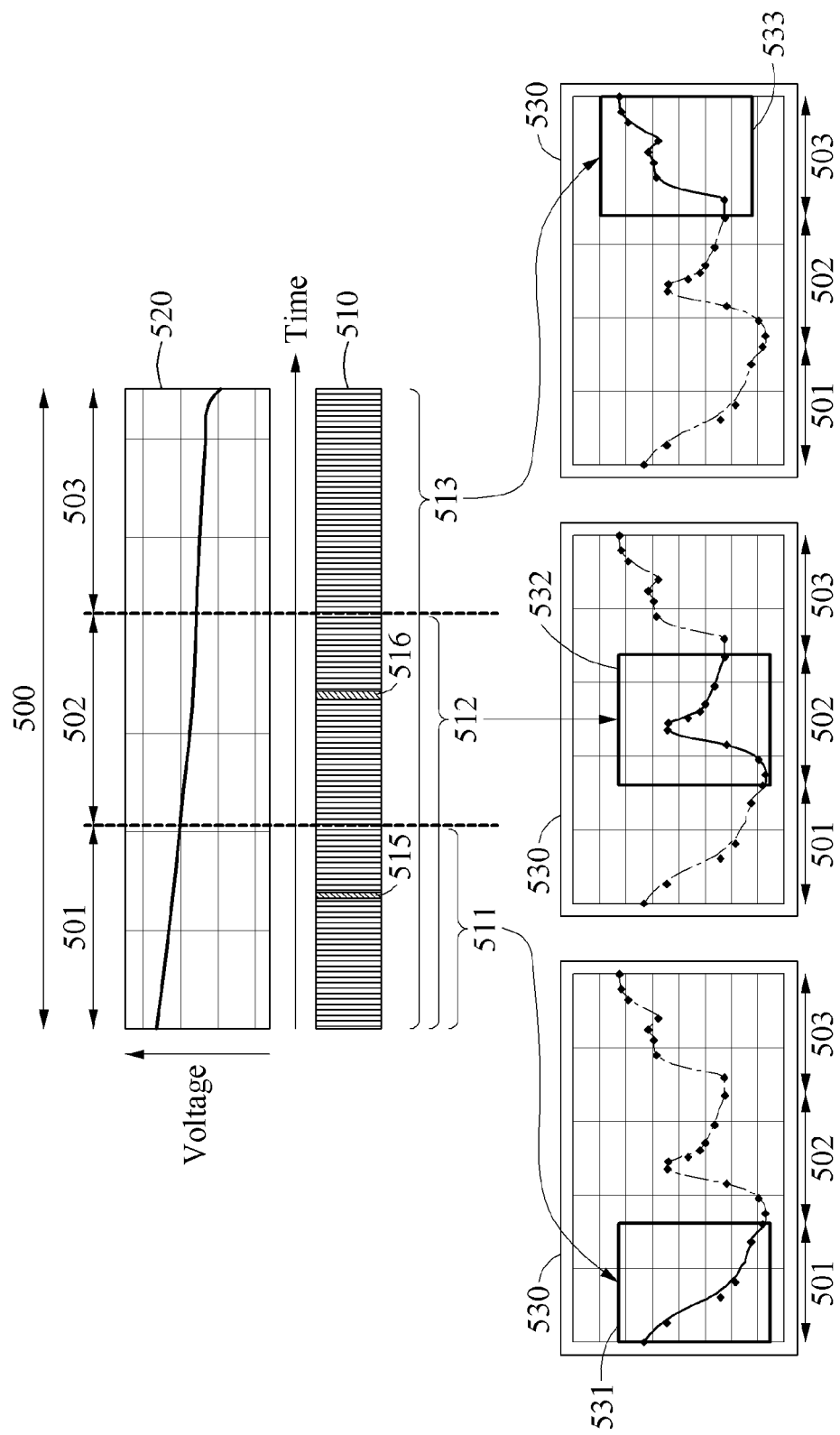
FIG. 5 illustrates an example of optimization for each state of charge (SoC) section.

Since a constant parameter has a constant value irrespective of a SoC section, the above description of the selective adjustment may not be applied directly. However, because a SoC estimation error is more likely to occur in a low SoC section compared to a high SoC section, the battery optimization apparatus may employ a technique to adjust the constant parameter in the low SoC section. For example, when the optimization is performed using the operating data during the battery discharging, the constant parameter may be optimized along with the third parameter set of the discharging parameter. According to the foregoing explanation for Equation 5, the optimization loss may be calculated while the third parameter set is adjusted in the parameter set $\hat{\theta}_2$. In this case, the optimization loss may be calculated while the third parameter set and the constant parameter are adjusted in the parameter set FIG. 5 illustrates an example of optimization for each SoC section. Referring to FIG. 5, a graph 520 shows a battery voltage of an operating data set 510 with time. Since the voltage decreases by the lapse of time, it can be known that the operating data set 510 is measured when the battery is discharged. An entire SoC section 500 may be segmented into a first SoC section 501, the second SoC section 502, and the third SoC section 503 based on a level or magnitude of the SoC. For example, the first SoC section 501 may correspond to SoC levels of 1.0 through 0.7, the second SoC section 502 may correspond to SoC levels 0.7 through 0.4, and the third SoC section 503 may correspond to SoC levels of 0.4 through 0.0.

The operating data set 510 includes the first operating data 515 and the second operating data 516. The first operating data 515 may correspond to a first SoC value. The second operating data 516 may correspond to a second SoC value. ECT parameters 530 may correspond to discharging parameters (e.g., anode discharging parameter). The ECT parameters 530 are plotted on the graph. In the graph, a horizontal axis represents a SoC (e.g., 1.0 to 0.0) and a vertical axis represents a diffusion concentration. The ECT parameters 530 may be classified into a first parameter set 531 belonging to the first SoC section 501, a second parameter set 532 belonging to the second SoC section 502, and a third parameter set 533 belonging to the third SoC section 503.

Since the first SoC value of the first operating data 515 belongs to the first SoC section 501, the first parameter set 531 may be selectively adjusted based on the first operating data 515. As such, the first parameter set 531 may be selectively adjusted based on a first operating data group 511 of the first SoC section 501. In this process, the second parameter set 532 and the third parameter set 533 may be maintained without being adjusted. When all the operating data in the first operating data group 511 is processed, the first parameter set 531 may be fixed. Since the second SoC value belongs to the second SoC section 502, the second parameter set 532 may be selectively adjusted based on the first operating data 515 and the second operating data 516. As such, the second parameter set 532 may be selectively adjusted based on a second operating data group 512 of the first SoC section 501 and the second SoC section 502. At this time, while the first parameter set 531 is fixed, estimation candidates for the second parameter set 532 may be determined. When all the operating data of the second operating data group 512 is processed, the second parameter set 532 may be fixed. Likewise, the third parameter set 533 may be selectively adjusted based on a third operating data group 513 of the first SoC section 501, the second SoC section 502, and the third SoC section 503.

A target apparatus may use a parameter updated in a new cycle after a point in time at which a parameter update of the ECT model 111 is completed. In this case, when there is a difference between points in time that the update is completed for respective SoC sections, each updated parameter set may be individually used based on a completion time of a corresponding section. For example, although an update of the first parameter set 531 of the first SoC section 501 is completed, an update of the second parameter set 532 of the second SoC section 502 may be in progress. In this example, the target apparatus may use the updated first parameter set 531 to estimate a SoC of the first SoC section 501 and use the existing second parameter set 532 to estimate a SoC of the second SoC section 502.

Figure 6:
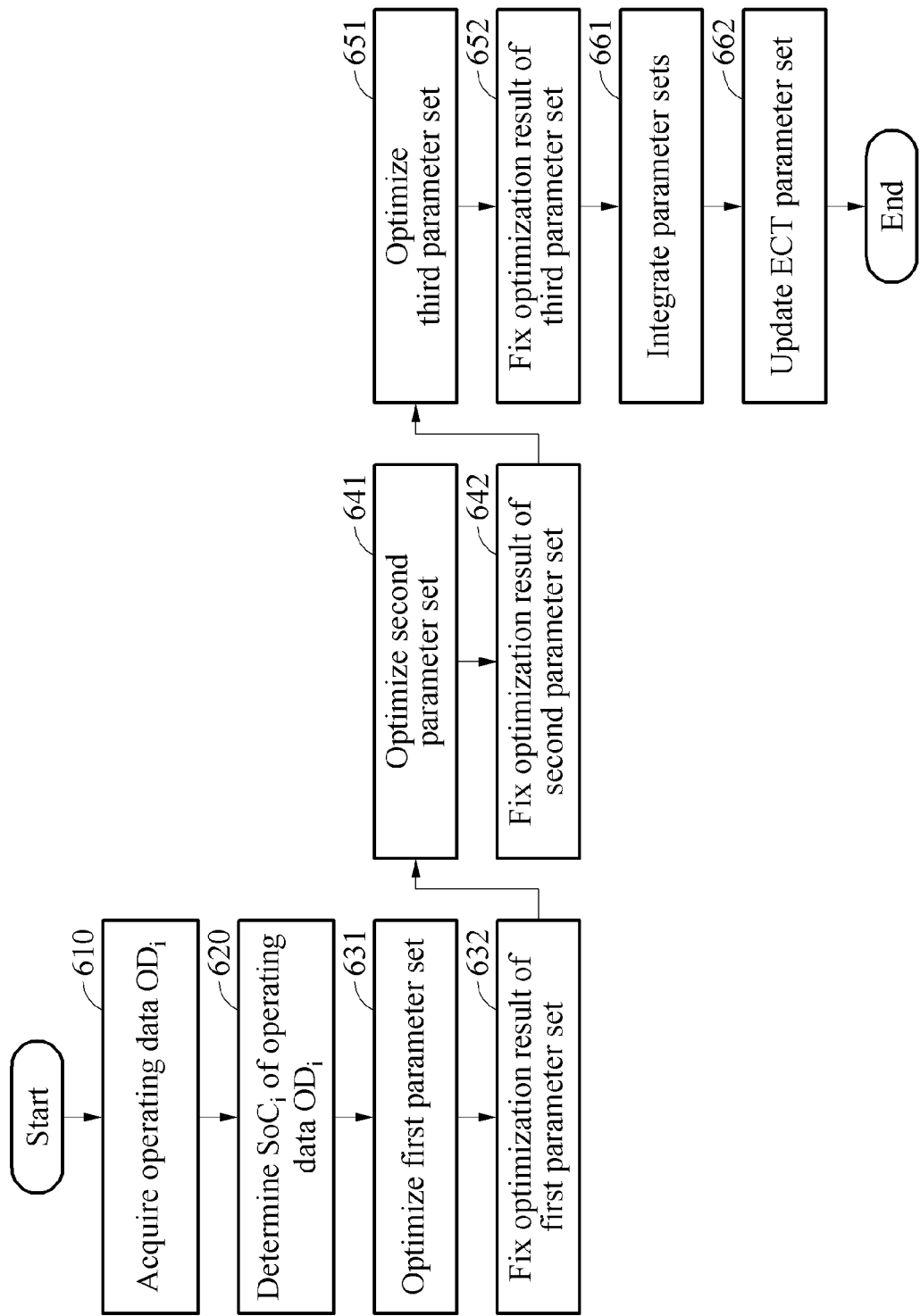
FIG. 6 illustrates an example of an optimization operation for optimization for each SoC section.

FIG. 6 illustrates an example of an optimization operation for optimization for each SoC section. FIG. 6 illustrates an example of a method of training a neural network to generate an image. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, a battery optimization apparatus acquires operating data $OD_i$, i being a value ranging between 1 and n. In operation 620, the battery optimization apparatus determines a $SoC_i$ of the operating data $OD_i$.

In operation 631, the battery optimization apparatus optimizes a first parameter set using the operating data $OD_i$. For example, an optimization search based on machine learning such as Bayesian optimization may be performed. The first parameter set may represent parameters belonging to the first SoC section in the entire ECT parameter set. The operating data $OD_i$ having indices 1 to j may be used for optimization search of the first parameter set. When the optimization of the first parameter set is completed, in operation 632, the battery optimization apparatus may fix the optimization result of the first parameter set.

In operation 641, the battery optimization apparatus optimizes a second parameter set using the operating data $OD_i$. The second parameter set may represent parameters belonging to the second SoC section in the entire ECT parameter set. The operating data $OD_i$ having the indices 1 to j may be used for optimization search of the second parameter set. When the optimization of the second parameter set is completed, in operation 642, the battery optimization apparatus may fix the optimization result of the second parameter set.

In operation 651, the battery optimization apparatus optimizes a third parameter set using the operating data $OD_i$. The third parameter set may represent parameters belonging to the third SoC section in the entire ECT parameter set. Operating data $OD_n$ having indices 1 to j may be used for optimization search of the third parameter set. When the optimization of the third parameter set is completed, in operation 652, the battery optimization apparatus may fix the optimization result of the third parameter set. The battery optimization apparatus may integrate the parameter sets in operation 661 and update the ECT parameter set with a new integrated parameter set in operation 662. When the update of the ECT parameter is completed, a target apparatus may estimate a battery SoC using the updated ECT parameter.

Figure 7:
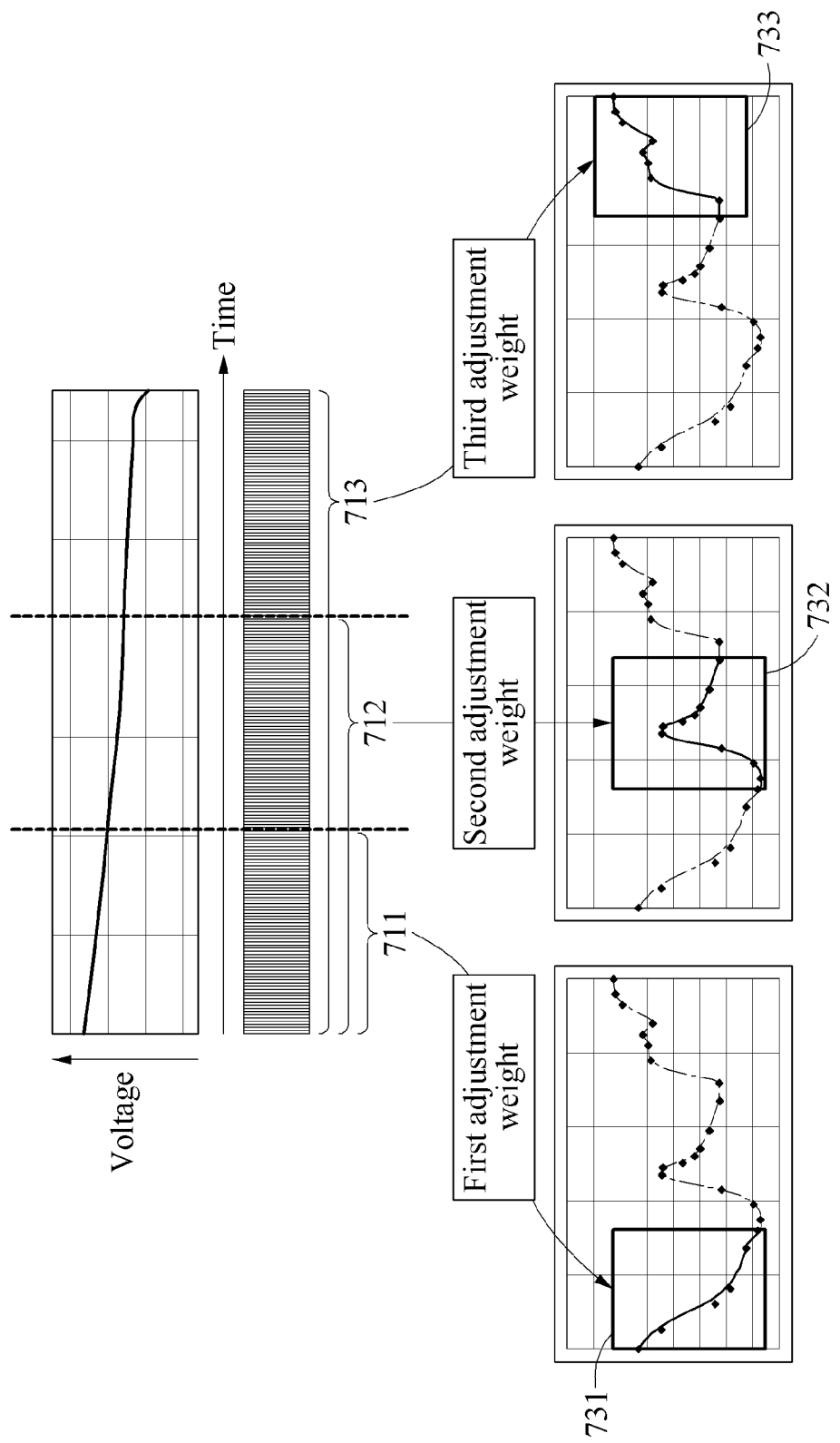
FIG. 7 illustrates an example of optimization using an adjustment weight.

FIG. 7 illustrates an example of optimization using an adjustment weight. Referring to FIG. 7, a battery optimization apparatus may selectively adjust a first parameter set 731 using a first operating data group 711 of a first SoC section, selectively adjust a second parameter set 732 using a second operating data group 712 of a second SoC section, and selectively adjust a third parameter set 733 using a third operating data group 713 of a third SoC section. The battery optimization apparatus may apply different adjustment weights to adjust respective parameter sets. The battery optimization apparatus may increase an update intensity by applying a higher adjustment weight to a section corresponding to a higher probability of an occurrence of an estimation error. For example, in general, a SoC estimation error may be high at a low SoC level. Reflecting this, an adjustment weight of 0.3 may be applied to the first parameter set 731, an adjustment weight of 0.7 may be applied to the second parameter set 732, and an adjustment weight of 1.0 may be applied to the third parameter set 733.

The battery optimization apparatus may apply the adjustment weight by multiplying an optimization loss by the adjustment weight. For example, when a first optimization loss is obtained through first operating data of the first operating data group 711, the battery optimization apparatus may reduce an update effect of the first optimization loss 0.3 times by multiplying the first optimization loss by the adjustment weight of 0.3. Likewise, each optimization loss of the second operating data group 712 may be multiplied by the adjustment weight of 0.7, and each optimization loss of the third operating data group 713 may be multiplied by the adjustment weight of 1.0. Through this, the update may be performed with the highest intensity by the third operating data group 713. Also, as described above, a constant parameter may be adjusted together in an adjustment process of the third parameter set 733. Such configuration of the adjustment weight may improve an accuracy of the constant parameter.

Figure 8:
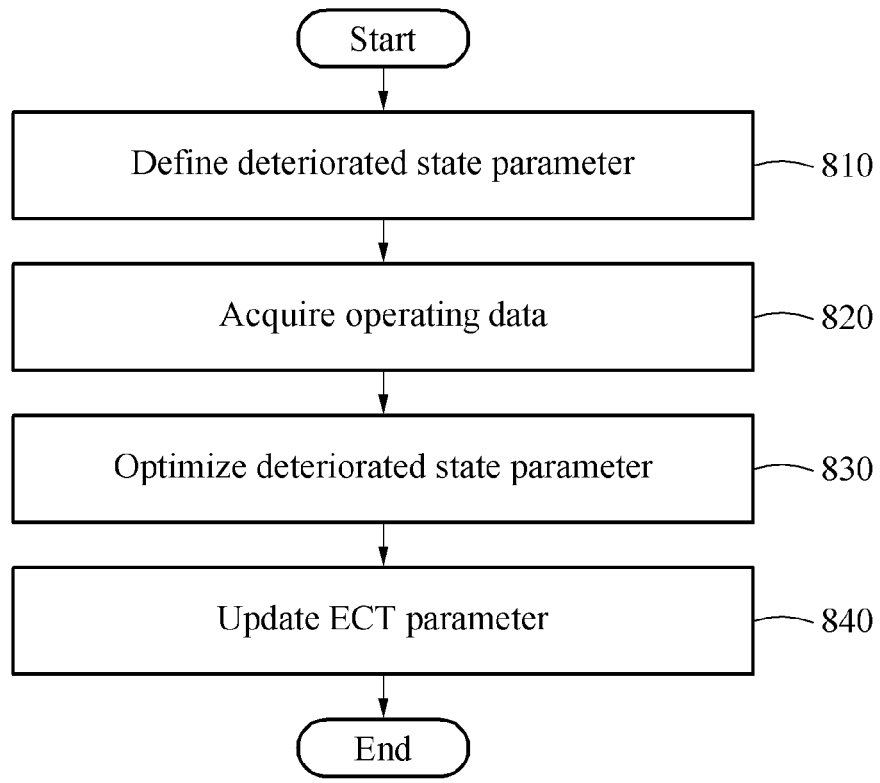
FIG. 8 illustrates an example of an optimization operation using a deteriorated state parameter.

FIG. 8 illustrates an example of an optimization operation using a deteriorated state parameter. FIG. 8 illustrates an example of a method of training a neural network to generate an image. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, a battery optimization apparatus defines a deteriorated state parameter. The deteriorated state parameter may include, for example, a film resistance, a volume fraction of an active material, and an anode-cathode OCP offset. The aforementioned parameters may be constant parameters and may best reflect a deterioration state of the battery form among the ECT parameters.

The battery optimization apparatus acquires operating data in operation 820, optimizes the deteriorated state parameter in operation 830, and updates the ECT parameter using a new optimized deteriorated state parameter in operation 840. When adjusting the constant parameter along with a diffusion parameter, the battery optimization apparatus may selectively adjust the deteriorated state parameter instead of adjusting the entire constant parameter, or selectively adjust the deteriorated state parameter of the constant parameter without adjusting the diffusion parameter. As such, when optimizing the constant parameter, the battery optimization apparatus may selectively optimize the deteriorated state parameter, thereby reducing an amount of calculation for optimization. For example, when a computational capacity of a processor is insufficient or a quick update is required, the selective optimization of the deteriorated state parameter may be performed.

Figure 9:
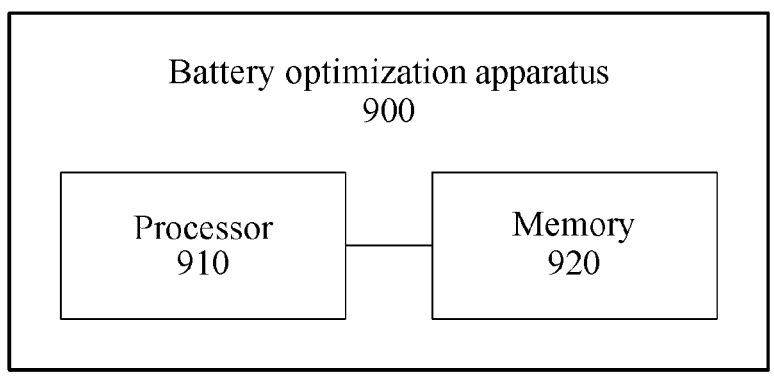
FIG. 9 illustrates an example of a battery optimization apparatus.

FIG. 9 illustrates an example of a battery optimization apparatus. Referring to FIG. 9, a battery optimization apparatus 900 includes a processor 910 and a memory 920. The memory 920 may be connected to the processor 910 and store instructions to be executed by the processor 910, data to be computed by the processor 910, or data that has been processed by the processor 910. The memory 920 may be a volatile or nonvolatile memory.

In an example, the volatile memory device may be, for example, a high-speed random-access memory and/or a non-volatile computer-readable storage media, a dynamic random-access memory (DRAM), a static RAM (SRAM), a thyristor RAM (T-RAM), a zero-capacitor RAM (Z-RAM), or a twin-transistor RAM (TTRAM), one or more disk storage devices, flash memory devices, or other non-volatile solid state memory devices. Further description of the memory 920 is given below.

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferro-electric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 920 is given below.

The processor 910 may execute instructions to perform an operation according to the description of FIGS. 1 through 8 and 10 through FIG. 13. The processor 910 may be a hardware including a circuit having a physical structure to perform desired operations. For example, the desired operations may include instructions or codes included in a program. For example, the hardware-implemented tracking apparatus may include for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

Figure 10:
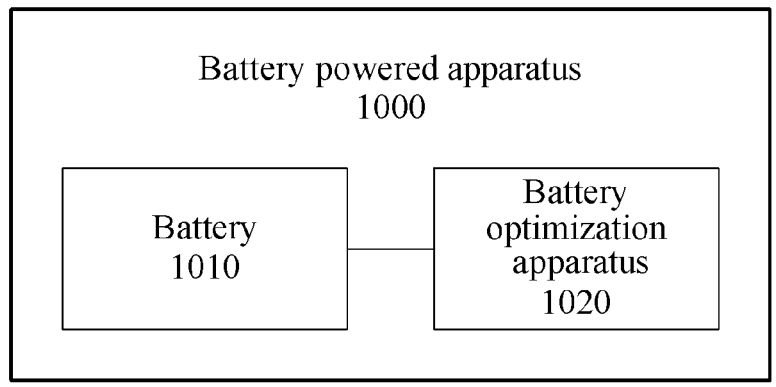
FIG. 10 illustrates an example of a battery powered apparatus including a battery optimization apparatus.

For example, the processor 910 may determine a first SoC value corresponding to first operating data of a battery, select a first SoC section to which the first SoC value belongs from an entire SoC section, selectively adjust, based on the first operating data, a first parameter set related to the first SoC section from among a plurality of parameters of an ECT model that simulates the battery, and update the plurality of parameters of the ECT model based on the adjusted first parameter set. In addition, the description of FIGS. 1 through 8 and 10 through 13 may apply to the battery optimization apparatus 900. Further description of the processor 910 is given below FIG. 10 illustrates an example of a battery powered apparatus including a battery optimization apparatus. Referring to FIG. 10, a battery powered apparatus 1000 includes a battery 1010 and a battery optimization apparatus 1020. The battery optimization apparatus 1020 may be implemented as at least a part of a battery management system (BMS) of the battery powered apparatus 1000. The battery 1010 may supply power to the battery powered apparatus 1000, so that the battery optimization apparatus 1020 collects operating data of the battery 1010 and maintains an optimized state of the battery 1010. For example, the operating data may be generated in accordance with the battery 1010 operating while a user uses the battery powered apparatus 1000.

The battery optimization apparatus 1020 may perform optimization based on an on-device method. In this case, the battery optimization apparatus 1020 may significantly reduce a computational operation for optimization through selective optimization. In an example, the battery optimization apparatus 1020 may perform the optimization using a cloud server. The battery optimization apparatus 1020 may store an ECT parameter set and operating data through synchronization in the cloud server. When optimization is required, the cloud server may process an optimization operation and provide a result of the optimization operation to the battery optimization apparatus 1020. The battery optimization apparatus 1020 may update the ECT parameter set with the optimization result received from the cloud server. The battery powered apparatus 1000 may be driven by the power supplied from the battery 1010. In this case, a SoC of the battery 1010 may be accurately estimated using an ECT model based on an ECT parameter optimized by the battery optimization apparatus 1020. In addition, the description of FIGS. 1 through 9 and 11 through 13 may apply to the battery powered apparatus 1000.

Figure 11:
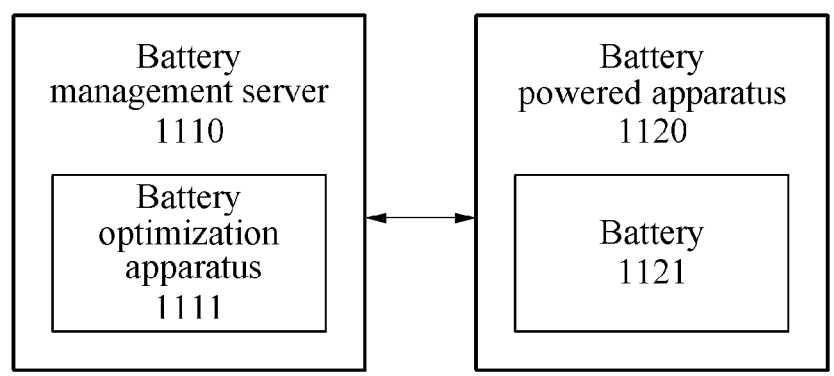
FIG. 11 illustrates an example of a battery management server including a battery optimization apparatus.

FIG. 11 illustrates an example of a battery management server including a battery optimization apparatus. Referring to FIG. 11, unlike FIG. 10, a battery optimization apparatus 1111 is included in a battery management server 1110. The battery optimization apparatus 1111 may receive operating data of a battery 1121 from a battery powered apparatus 1120 and store the received operating data. When optimization is required, the battery optimization apparatus 1111 may process an optimization operation based on the operating data and provide a result of the optimization operation to battery powered apparatus 1120. In an example, a communication module and a BMS may perform an operation between the battery optimization apparatus 1111 and the battery 1121. The battery powered apparatus 1120 may be driven by power supplied from the battery 1121. In this case, a SoC of the battery 1121 may be accurately estimated using an ECT model based on an ECT parameter optimized by the battery optimization apparatus 1111. In addition, the description of FIGS. 1 through 10 and 11 through 13 may apply to the battery powered apparatus 1000.

Figure 12:
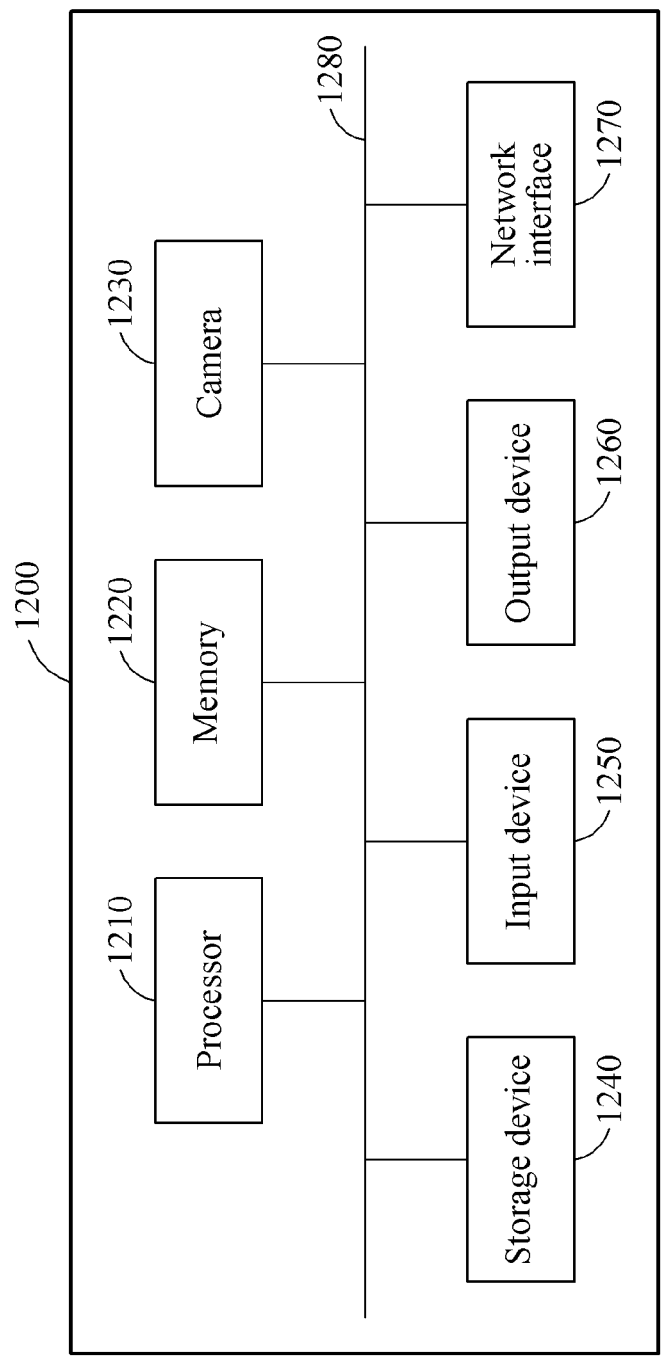
FIG. 12 illustrates an example of an electronic apparatus.

FIG. 12 illustrates an example of an electronic apparatus. Referring to FIG. 12, an electronic apparatus 1200 includes a processor 1210, a memory 1220, a camera 1230, a storage device 1240, an input device 1250, an output device 1260, and a network interface 1270. The processor 1210, the memory 1220, the camera 1230, the storage device 1240, the input device 1250, the output device 1260, and the network interface 1270 may communicate through a communication bus 1280. For example, the electronic apparatus 1200 may be implemented as a portion of a mobile device such as a mobile phone, a smartphone, a PDA, a netbook, a tablet computer, and a laptop computer, a wearable device such as a smart watch, a smart band, and smart glasses, a computing device such as a desktop and a server, home appliances such as a television (TV) a smart TV, a vacuum cleaner, and a refrigerator, a security device such as a door lock, or a vehicle such as a smart car. The electronic apparatus 1200 may incorporate any one of the battery optimization apparatus 110 of FIG. 1, the battery optimization apparatus 900 of FIG. 9, the battery powered apparatus 1000 of FIG. 10, and the battery management server 1110 and/or the battery powered apparatus 1120 of FIG. 11.

The processor 1210 executes functions and instructions for execution in the electronic apparatus 1200. For example, the processor 1210 may process instructions stored in the memory 1220 or the storage device 1240. The processor 1210 may perform one or more operations described with reference to FIGS. 1 through 11 and 13. The memory 1220 may store data for battery optimization. The memory 1220 may include a computer-readable storage medium or a computer-readable storage device. The memory 1220 may store instructions to be executed by the processor 1210 and store relevant information while software and/or an application is executed by the electronic apparatus 1200.

The camera 1230 may capture an image and/or a video. The camera 1230 may be a 3D camera including depth information on objects. The storage device 1240 includes a computer-readable storage medium or a computer-readable storage device. The storage device 1240 may store a larger quantity of information compared to the memory 1220 and store information for a long time. The storage device 1240 may include, for example, a magnetic hard disk, an optical disk, a flash memory, a floppy disk, or other types of non-volatile memories known in the art.

The input device 1250 may receive an input from a user based on a traditional input method using a keyboard and a mouse and a new input method such as a touch input, a voice input, a gesture input, and an image input. For example, the input device 1250 may include any device that detects an input from a keyboard, a mouse, a touch screen, a microphone, or a user and transfers the detected input to the electronic apparatus 1200. The output device 1260 may provide an output of the electronic apparatus 1200 to a user through a visual, auditory, or tactile channel. The output device 1260 may include, for example, a display, a touch screen, a speaker, a vibration generating device, or any device for providing an output to a user. For example, the network interface 1270 may communicate with an external device through a wired or wired network.

Figure 13:
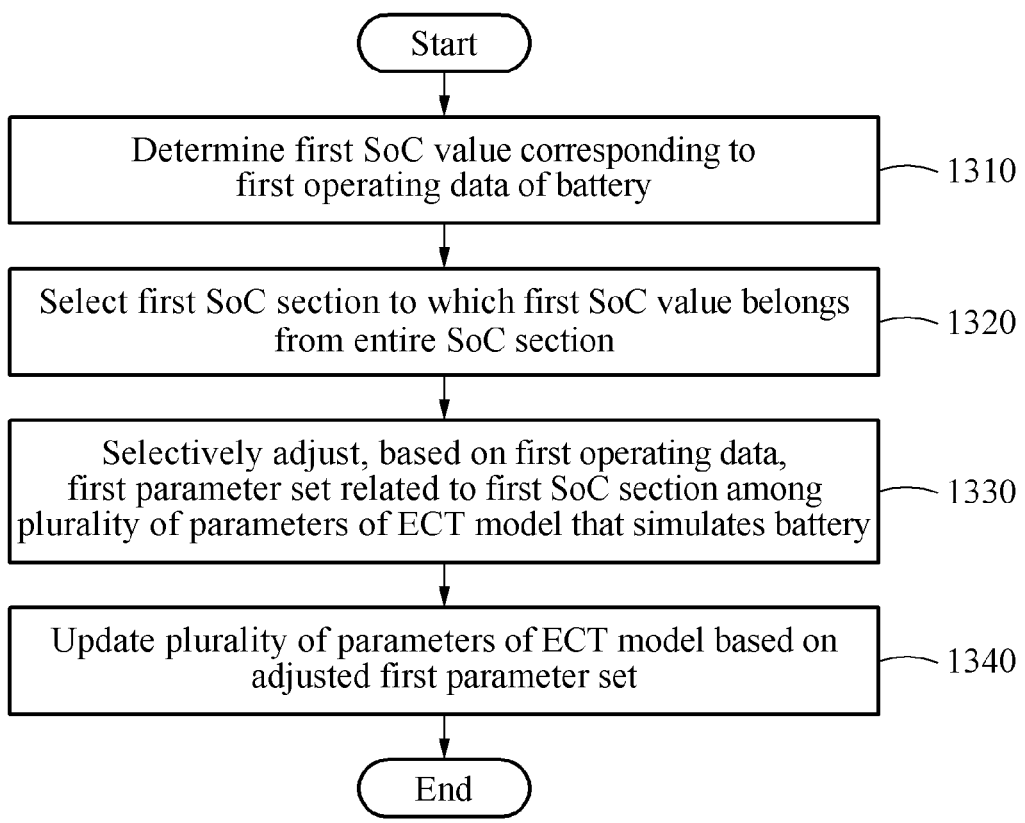
FIG. 13 illustrates an example of a battery optimization operation.

FIG. 13 illustrates an example of a battery optimization operation. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer, such as a processor, that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Referring to FIG. 13, a battery optimization apparatus determines a first SoC value corresponding to first operating data of a battery in operation 1310. In operation 1320, the battery optimization apparatus selects a first SoC section to which the first SoC value belongs from an entire SoC section. In operation 1330, the battery optimization apparatus selectively adjusts, based on the first operating data, a first parameter set related to the first SoC section among a plurality of parameters of an ECT model that simulates the battery. In operation 1340, the battery optimization apparatus updates the plurality of parameters of the ECT model based on the adjusted first parameter set.

The battery optimization apparatus 110, battery optimization apparatus 900, battery optimization apparatus 1020, battery optimization apparatus 1111, battery management server 1110, and other devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller.

One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in herein, which perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the battery optimization method. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented battery optimization method comprising:
    determining a first state of charge (SoC) value corresponding to first operating data of a battery, wherein the first operating data comprises at least one of a voltage, a current, or a temperature of the battery according to an operation of the battery;
    selecting a first SoC section corresponding to the first SoC value from an SoC section;
    selectively adjusting, based on the first operating data, a first parameter set, related to the first SoC section, selected from among parameters of an electrochemical thermal (ECT) model configured to simulate the battery, the parameters of the ECT model comprising the first parameter set;
    updating the parameters of the ECT model based on a result of the selectively adjusting the first parameter set; and
    performing a battery state optimization for the battery by controlling a charging of the battery using the ECT model with the updated parameters of the ECT model.

2. The battery optimization method of claim 1, wherein the parameters of the ECT model comprise one of a constant parameter independent of a SoC level of the battery and a diffusion parameter dependent on the SoC level of the battery, and
    each parameter of the first parameter set is the diffusion parameter.

3. The battery optimization method of claim 2, wherein the diffusion parameter comprises one of a charging parameter related to charging of the battery and a discharging parameter related to discharging of the battery.

4. The battery optimization method of claim 3, wherein the first parameter set comprises the charging parameter, in response to the first operating data being measured during the charging of the battery, and the first parameter set comprises the discharging parameter, in response to the first operating data being measured during the discharging of the battery.

5. The battery optimization method of claim 2, wherein the constant parameter comprises one of a film resistance, a volume fraction of an active material, and an anode-cathode open circuit potential (OCP) offset.

6. The battery optimization method of claim 1, wherein the battery is configured to supply power to a battery powered apparatus, and the first operating data is generated in response to the battery supplying the power to the battery powered apparatus.

7. The battery optimization method of claim 1, further comprising:

determining a new first parameter set by updating the first parameter set, in response to the selective adjusting of the first parameter set being completed; and selectively adjusting a second parameter set related to a second SoC section of the SoC section based on new parameters of the ECT model comprising the new first parameter set.

8. The battery optimization method of claim 7, wherein the selectively adjusting of the second parameter set comprises:

determining a second SoC value corresponding to second operating data of the battery;

selecting the second SoC section to which the second SoC value belongs from the SoC section; and selectively adjusting, based on the first operating data and the second operating data, the second parameter set related to the second SoC section from among the new parameters of the ECT model.

9. The battery optimization method of claim 8, wherein different adjustment weights are applied to selectively adjust the first parameter set and selectively adjust the second parameter set.

* * * * *